United States Patent
Raman et al.

(10) Patent No.: US 8,652,222 B2
(45) Date of Patent: Feb. 18, 2014

(54) BIOMASS COMPOSITIONS FOR CATALYTIC GASIFICATION

(75) Inventors: Pattabhi K. Raman, Long Grove, IL (US); Edwin J. Hippo, Round Lake, IL (US); Nelson Yee, Brooklyn, OH (US)

(73) Assignee: GreatPoint Energy, Inc., Cambridge, MA (US)

( * ) Notice: Subject to any disclaimer, the term of this patent is extended or adjusted under 35 U.S.C. 154(b) by 1011 days.

(21) Appl. No.: 12/395,447

(22) Filed: Feb. 27, 2009

(65) Prior Publication Data

US 2009/0217587 A1 Sep. 3, 2009

Related U.S. Application Data

(60) Provisional application No. 61/032,734, filed on Feb. 29, 2008.

(51) Int. Cl.
| | | |
|---|---|---|
| *C01B 3/38* | (2006.01) | |
| *C01C 1/02* | (2006.01) | |
| *C01B 31/18* | (2006.01) | |
| *C01B 31/20* | (2006.01) | |
| *C01B 17/16* | (2006.01) | |
| *C01B 3/32* | (2006.01) | |
| *C10L 5/40* | (2006.01) | |
| *C10L 5/42* | (2006.01) | |
| *C10L 5/44* | (2006.01) | |

(52) U.S. Cl.
USPC ............ 44/504; 44/500; 44/620; 48/127.7; 48/197 FM; 48/202; 423/352; 423/418.2; 423/437.1; 423/564; 423/580.1; 423/648.1; 423/652; 585/700; 585/733

(58) Field of Classification Search
USPC ................ 700/271, 266, 268; 422/55, 626; 48/197 R–197 A, 127.7, 197 FM, 202; 44/500, 504, 620; 423/352, 418.2, 423/437.1, 564, 580.1, 648.1, 652; 585/700, 733
See application file for complete search history.

(56) References Cited

U.S. PATENT DOCUMENTS

| | | |
|---|---|---|
| 2,605,215 A | 7/1952 | Coghlan |
| 2,694,623 A | 11/1954 | Welty, Jr. et al. |
| 2,791,549 A | 5/1957 | Jahnig |
| 2,813,126 A | 11/1957 | Tierney |
| 2,860,959 A | 11/1958 | Pettyjohn et al. |
| 2,886,405 A | 5/1959 | Benson et al. |
| 3,034,848 A | 5/1962 | King |
| 3,114,930 A | 12/1963 | Oldham et al. |
| 3,150,716 A | 9/1964 | Strelzoff et al. |
| 3,164,330 A | 1/1965 | Neidl |
| 3,351,563 A | 11/1967 | Negra et al. |
| 3,435,590 A | 4/1969 | Smith |
| 3,531,917 A | 10/1970 | Grunewald et al. |
| 3,544,291 A | 12/1970 | Schlinger et al. |
| 3,594,985 A | 7/1971 | Ameen et al. |
| 3,615,300 A | 10/1971 | Holm et al. |
| 3,689,240 A | 9/1972 | Aldridge et al. |
| 3,740,193 A | 6/1973 | Aldridge et al. |
| 3,746,522 A | 7/1973 | Donath |
| 3,759,036 A | 9/1973 | White |
| 3,779,725 A | 12/1973 | Hegarty et al. |
| 3,814,725 A | 6/1974 | Zimmerman et al. |
| 3,817,725 A | 6/1974 | Sieg et al. |
| 3,828,474 A | 8/1974 | Quartulli |
| 3,833,327 A | 9/1974 | Pitzer et al. |
| 3,847,567 A | 11/1974 | Kalina et al. |
| 3,876,393 A | 4/1975 | Kasai et al. |
| 3,904,386 A | 9/1975 | Graboski et al. |
| 3,915,670 A | 10/1975 | Lacey et al. |
| 3,920,229 A | 11/1975 | Piggott |
| 3,929,431 A | 12/1975 | Koh et al. |
| 3,958,957 A | 5/1976 | Koh et al. |
| 3,966,875 A | 6/1976 | Bratzler et al. |
| 3,969,089 A | 7/1976 | Moss et al. |
| 3,971,639 A | 7/1976 | Matthews |
| 3,972,693 A | 8/1976 | Wiesner et al. |
| 3,975,168 A | 8/1976 | Gorbaty |
| 3,985,519 A | 10/1976 | Kalina et al. |

(Continued)

FOREIGN PATENT DOCUMENTS

| | | |
|---|---|---|
| CA | 966660 | 4/1975 |
| CA | 1003217 | 1/1977 |

(Continued)

OTHER PUBLICATIONS

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

(Continued)

*Primary Examiner* — Wayne Langel
*Assistant Examiner* — Syed Iqbal
(74) *Attorney, Agent, or Firm* — McDonnell Boehnen Hulbert & Berghoff LLP

(57) ABSTRACT

Particulate compositions are described comprising an intimate mixture of a biomass, such as switchgrass or hybrid poplar, a non-biomass carbonaceous material, such as petroleum coke or coal, and a gasification catalyst, where the gasification catalyst is loaded onto at least one of the biomass or non-biomass for gasification in the presence of steam to yield a plurality of gases including methane and at least one or more of hydrogen, carbon monoxide, and other higher hydrocarbons are formed. Processes are also provided for the preparation of the particulate compositions and converting the particulate composition into a plurality of gaseous products.

9 Claims, No Drawings

(56) References Cited

U.S. PATENT DOCUMENTS

| | | |
|---|---|---|
| 3,989,811 A | 11/1976 | Hill |
| 3,996,014 A | 12/1976 | Muller et al. |
| 3,998,607 A | 12/1976 | Wesselhoft et al. |
| 3,999,607 A | 12/1976 | Pennington et al. |
| 4,005,996 A | 2/1977 | Hausberger et al. |
| 4,011,066 A | 3/1977 | Bratzler et al. |
| 4,017,272 A | 4/1977 | Anwer et al. |
| 4,021,370 A | 5/1977 | Harris et al. |
| 4,025,423 A | 5/1977 | Stonner et al. |
| 4,044,098 A | 8/1977 | Miller et al. |
| 4,046,523 A | 9/1977 | Kalina et al. |
| 4,052,176 A | 10/1977 | Child et al. |
| 4,053,554 A | 10/1977 | Reed et al. |
| 4,057,512 A | 11/1977 | Vadovic et al. |
| 4,069,304 A | 1/1978 | Starkovish et al. |
| 4,077,778 A | 3/1978 | Nahas et al. |
| 4,091,073 A | 5/1978 | Winkler |
| 4,092,125 A | 5/1978 | Stambaugh et al. |
| 4,094,650 A | 6/1978 | Koh et al. |
| 4,100,256 A | 7/1978 | Bozzelli et al. |
| 4,101,449 A | 7/1978 | Noda et al. |
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,223,728 A | 9/1980 | Pegg |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A * | 3/1982 | Lang et al. ............... 48/202 |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,341,531 A | 7/1982 | Duranleau et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,385,905 A | 5/1983 | Tucker |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A | 4/1984 | Queneau et al. |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,696,678 A | 9/1987 | Koyama et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,074,357 A | 12/1991 | Haines |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,225,044 A | 7/1993 | Breu |
| 5,236,557 A | 8/1993 | Muller et al. |
| 5,250,083 A | 10/1993 | Wolfenbarger et al. |
| 5,277,884 A | 1/1994 | Shinnar et al. |
| 5,388,645 A | 2/1995 | Puri et al. |
| 5,388,650 A | 2/1995 | Michael |
| 5,435,940 A | 7/1995 | Doering et al. |
| 5,536,893 A | 7/1996 | Gudmundsson |
| 5,566,755 A | 10/1996 | Seidle et al. |

(56) References Cited

U.S. PATENT DOCUMENTS

| | | |
|---|---|---|
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,669,960 A | 9/1997 | Couche |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,032,737 A | 3/2000 | Brady et al. |
| 6,090,356 A | 7/2000 | Jahnke et al. |
| 6,119,778 A | 9/2000 | Seidle et al. |
| 6,132,478 A | 10/2000 | Tsurui et al. |
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,419,888 B1 | 7/2002 | Wyckoff |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,830,597 B1 | 12/2004 | Green |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,077,202 B2 | 7/2006 | Shaw et al. |
| 7,100,692 B2 | 9/2006 | Parsley et al. |
| 7,118,720 B1 | 10/2006 | Mendelsohn et al. |
| 7,132,183 B2 | 11/2006 | Galloway |
| 7,168,488 B2 | 1/2007 | Olsvik et al. |
| 7,205,448 B2 | 4/2007 | Gajda et al. |
| 7,220,502 B2 | 5/2007 | Galloway |
| 7,299,868 B2 | 11/2007 | Zapadinski |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,677,309 B2 | 3/2010 | Shaw et al. |
| 7,758,663 B2 | 7/2010 | Rabovitser et al. |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 8,114,176 B2 | 2/2012 | Nahas |
| 8,114,177 B2 | 2/2012 | Hippo et al. |
| 8,123,827 B2 | 2/2012 | Robinson |
| 8,163,048 B2 | 4/2012 | Rappas et al. |
| 8,192,716 B2 | 6/2012 | Raman et al. |
| 8,202,913 B2 | 6/2012 | Robinson et al. |
| 8,268,899 B2 | 9/2012 | Robinson et al. |
| 8,286,901 B2 | 10/2012 | Rappas et al. |
| 8,297,542 B2 | 10/2012 | Rappas et al. |
| 8,328,890 B2 | 12/2012 | Reiling et al. |
| 8,349,037 B2 | 1/2013 | Steiner et al. |
| 8,349,039 B2 | 1/2013 | Robinson |
| 8,361,428 B2 | 1/2013 | Raman et al. |
| 8,366,795 B2 | 2/2013 | Raman et al. |
| 8,479,833 B2 | 7/2013 | Raman |
| 8,479,834 B2 | 7/2013 | Preston |
| 8,502,007 B2 | 8/2013 | Hippo et al. |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0023086 A1 | 2/2004 | Su et al. |
| 2004/0123601 A1 | 7/2004 | Fan |
| 2004/0180971 A1 | 9/2004 | Inoue et al. |
| 2004/0256116 A1 | 12/2004 | Olsvik et al. |
| 2005/0107648 A1 | 5/2005 | Kimura et al. |
| 2005/0137442 A1 | 6/2005 | Gajda et al. |
| 2005/0192362 A1 | 9/2005 | Rodriguez et al. |
| 2005/0287056 A1 | 12/2005 | Baker et al. |
| 2005/0288537 A1 | 12/2005 | Maund et al. |
| 2006/0149423 A1 | 7/2006 | Barnicki et al. |
| 2006/0228290 A1 | 10/2006 | Green |
| 2006/0231252 A1 | 10/2006 | Shaw et al. |
| 2006/0265953 A1 | 11/2006 | Hobbs |
| 2006/0272813 A1 | 12/2006 | Olsvik et al. |
| 2007/0000177 A1* | 1/2007 | Hippo et al. ............... 48/210 |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovister et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2008/0141591 A1 | 6/2008 | Kohl |
| 2008/0289822 A1 | 11/2008 | Betzer Tsilevich |
| 2009/0012188 A1 | 1/2009 | Rojey et al. |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0235585 A1 | 9/2009 | Neels et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0305093 A1 | 12/2009 | Biollaz et al. |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0018113 A1 | 1/2010 | Bohlig et al. |
| 2010/0050654 A1 | 3/2010 | Chiu et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |

(56) References Cited

U.S. PATENT DOCUMENTS

| | | | |
|---|---|---|---|
| 2010/0120926 A1 | 5/2010 | Robinson et al. |
| 2010/0121125 A1 | 5/2010 | Hippo et al. |
| 2010/0159352 A1 | 6/2010 | Gelin et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |
| 2011/0294905 A1 | 12/2011 | Robinson et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |
| 2013/0042824 A1 | 2/2013 | Sirdeshpande |
| 2013/0046124 A1 | 2/2013 | Sirdeshpande |
| 2013/0172640 A1 | 7/2013 | Robinson et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 1282243 | 4/1991 |
| CA | 1299589 | 4/1992 |
| CA | 1332108 | 9/1994 |
| CA | 2673121 | 6/2008 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1004746 | 5/2000 |
| EP | 1136542 | 9/2001 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 03-115491 | 5/1991 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |

(56) References Cited

FOREIGN PATENT DOCUMENTS

| | | |
|---|---|---|
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | 2010/132549 | 11/2010 |
| WO | WO 2010/132551 | 11/2010 |
| WO | 2011/017630 | 2/2011 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/034888 | 3/2011 |
| WO | 2011/034889 | 3/2011 |
| WO | 2011/034891 | 3/2011 |
| WO | WO 2011/034890 | 3/2011 |
| WO | 2011/049858 | 4/2011 |
| WO | 2011/049861 | 4/2011 |
| WO | 2011/063608 | 6/2011 |
| WO | 2011/084580 | 7/2011 |
| WO | 2011/084581 | 7/2011 |
| WO | 2011/106285 | 9/2011 |
| WO | 2011/139694 | 11/2011 |
| WO | 2011/150217 | 12/2011 |
| WO | WO 2012/024369 | 2/2012 |
| WO | 2012/033997 | 3/2012 |
| WO | 2012/061235 | 5/2012 |
| WO | 2012/061238 | 5/2012 |
| WO | 2012/116003 | 8/2012 |
| WO | 2012/145497 | 10/2012 |
| WO | 2012/166879 | 12/2012 |
| WO | 2013/025808 | 2/2013 |
| WO | 2013/025812 | 2/2013 |
| WO | 2013/052553 | 4/2013 |

OTHER PUBLICATIONS

Berger, R., et al., "High Temperature CO$_2$-Absorption: A Process Offering New Prospects in Fuel Chemistry," The Fifth International Symposium on Coal Combustion, Nov. 2003, Nanjing, China, pp. 547-549.
Brown et al., "Biomass-Derived Hydrogen From A Thermally Ballasted Gasifier," Aug. 2005.
Brown et al., "Biomass-Derived Hydrogen From A Thermally Ballasted Gasifier," DOE Hydrogen Program Contractors' Review Metting, Center for Sustainable Environmental Technologies, Iowa State University, May 21, 2003.
Coal Conversion Processes (Gasification), Encyclopedia of Chemical Technology, 4$^{th}$ Edition, vol. 6, pp. 541-566.
Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.
Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.
Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No., E(49-18)-2369, 1978.
Nahas, N.C., "Exxon Catalytic Coal Gasification Process—Fundamentals to Flowsheets," Fuel, vol. 62, No. 2, 1983, pp. 239-241.
Ohtsuka, Y. et al., "Highly Active Catalysts from Inexpensive Raw Materials for Coal Gasification," Catalysis Today, vol. 39, 1997, pp. 111-125.
Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.
Ohtsuka, Yasuo et al., "Calcium Catalysed Steam Gasification of Yalourn Brown Coal," Fuel, vol. 65, 1986, pp. 1653-1657.
Ohtsuka, Yasuo, et al, "Iron-Catalyzed Gasification of Brown Coal at Low Temperatures," Energy & Fuels, vol. 1, No. 1, 1987, pp. 32-36.
Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.
Ohtsuka, Yasuo et al., "Steam Gasification of Coals with Calcium Hydroxide," Energy & Fuels, vol. 9, No. 6, 1995, pp. 1038-1042.
Pereira, P., et al., "Catalytic Steam Gasification of Coals," Energy & Fuels, vol. 6, No. 4, 1992, pp. 407-410.
Ruan Xiang-Quan, et al., "Effects of Catalysis on Gasification of Tatong Coal Char," Fuel, vol. 66, Apr. 1987, pp. 568-571.
Tandon, D., "Low Temperature and Elevated Pressure Steam Gasification of Illinois Coal," College of Engineering in the Graduate School, Southern Illinois university at Carbondale, Jun. 1996.
"Integrate Gasification Combined Cycle (IGCC)," WorleyParsons Resources & Energy, http://www.worleyparsons.com/v5/page.aspx?id=164.
U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.
Adsorption, http://en.wikipedia.org/wiki/Adsorption, pp. 1-8.
Amine gas treating, http://en.wikipedia.org/wiki/Acid_gas_removal, pp. 1-4.
Coal, http://en.wikipedia.org/wiki/Coal_gasification, pp. 1-8.
Coal Data: A Reference, Energy Information Administration, Office of Coal, Nuclear, Electric, and Alternate Fuels U.S. Department of Energy, DOE/EIA-0064(93), Feb. 1995.
Deepak Tandon, Dissertation Approval, "Low Temperature and Elevated Pressure Steam Gasification of Illinois Coal", Jun. 13, 1996.
Demibras, "Demineralization of Agricultural Residues by Water Leaching", *Energy Sources*, vol. 25, pp. 679-687, (2003).
Fluidized Bed Gasifiers, http://www.energyproducts.com/fluidized_bed_gasifiers.htm, pp. 1-5.
Gas separation, http://en.wikipedia.org/wiki/Gas_separation, pp. 1-2.
Gasification, http://en.wikipedia.org/wiki/Gasification, pp. 1-6.
Gallagher Jr., et al., "Catalytic Coal Gasification for SNG Manufacture", *Energy Research*, vol. 4, pp. 137-147, (1980).
Heinemann, et al., "Fundamental and Exploratory Studies of Catalytic Steam Gasification of Carbonaceous Materials", Final Report Fiscal Years 1985-1994.
Jensen, et al. Removal of K and Cl by leaching of straw char, *Biomass and Bioenergy*, vol. 20, pp. 447-457, (2001).
Mengjie, et al., "A potential renewable energy resource development and utilization of biomass energy", http://www.fao.org.docrep/T4470E/t4470e0n.htm, pp. 1-8.
Meyers, et al. Fly Ash as a Construction Material for Highways, A Manual. Federal Highway Administration, Report No. FHWA-IP-76-16, Washington, DC, 1976.
Coal Bottom Ash/Boiler Slag, http://www.p2pays.org/ref/13/12842/cbabs2.htm.
Natural gas processing, http://en.wikipedia.org/wiki/Natural_gas_processing, pp. 1-4.
Natural Gas Processing: The Crucial Link Between Natural Gas Production and Its Transportation to Market. Energy Information Administration, Office of Oil and Gas; pp. 1-11, (2006).
Prins, et al., "Exergetic optimisation of a production process of Fischer-Tropsch fuels from biomass", *Fuel Processing Technology*, vol. 86, pp. 375-389, (2004).
Reboiler, http://en.wikipedia.org/wiki/Reboiler, pp. 1-4.
What is XPS?, http://www.nuance.northwestern.edu/Keckll/xps1.asp, pp. 1-2.
2.3 Types of gasifiers, http://www.fao.org/docrep/t0512e/T0512e0a.htm, pp. 1-6.
2.4 Gasification fuels, http://www.fao.org/docrep/t0512e/T0512e0b.htm#TopofPage, pp. 1-8.
2.5 Design of downdraught gasifiers, http://www.fao.org/docrep/t0512e/T0512e0c.htm#TopOfPage, pp. 1-8.
2.6 Gas cleaning and cooling, http://www.fao.org/docrep/t0512e0d.htm#TopOFPage, pp. 1-3.

(56) References Cited

OTHER PUBLICATIONS

Moulton, Lyle K. "Bottom Ash and Boiler Slag", *Proceedings of the Third International Ash Utilization Symposium*, U.S. Bureau of Mines, Information Circular No. 8640, Washington, DC, 1973.

A.G. Collot et al., "Co-pyrolysis and co-gasification of coal and biomass in bench-scale fixed-bed and fluidized bed reactors", (1999) Fuel 78, pp. 667-679.

Wenkui Zhu et al., "Catalytic gasification of char from co-pyrolysis of coal and biomass", (2008) Fuel Processing Technology, vol. 89, pp. 890-896.

Chiesa P. et al., "Co-Production of hydrogen, electricity and CO2 from coal with commercially ready technology. Part A: Performance and emissions", (2005) International Journal of Hydrogen Energy, vol. 30, No. 7, pp. 747-767.

Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.

Brown et al., "Biomass-Derived Hydrogen From a thermally Ballasted Gasifier", Final Technical Report, Iowa State University, Aug. 2005.

Chiaramonte et al, "Upgrade Coke by Gasification", (1982) Hydrocarbon Processing, vol. 61 (9), pp. 255-257 (Abstract only).

Gerdes, Kristin, et al., "Integrated Gasification Fuel Cell Performance and Cost Assessment," National Energy Technology Laboratory, U.S. Department of Energy, Mar. 27, 2009, pp. 1-26.

Ghosh, S., et al., "Energy Analysis of a Cogeneration Plant Using Coal Gasification and Solid Oxide Fuel Cell," Energy, 2006, vol. 31, No. 2-3, pp. 345-363.

Jeon, S.K., et al., "Characteristics of Steam Hydrogasification of Wood Using a Micro-Batch Reactor," Fuel, 2007, vol. 86, pp. 2817-2823.

Li, Mu, et al., "Design of Highly Efficient Coal-Based Integrated Gasification Fuel Cell Power Plants," Journal of Power Sources, 2010, vol. 195, pp. 5707-5718.

Prins, M.J., et al., "Exergetic Optimisation of a Production Process of Fischer-Tropsch Fuels from Biomass," Fuel Processing Technology, 2005, vol. 86, No. 4, pp. 375-389.

U.S. Appl. No. 13/484,918, filed May 31, 2012.

U.S. Appl. No. 13/402,022, filed Feb. 22, 2012.

U.S. Appl. No. 13/450,995, filed Apr. 19, 2012.

Hydromethanation Process, GreatPoint Energy, Inc., from World Wide Web <http://greatpointenergy.com/ourtechnology.php.> accessed Sep. 5, 2013.

Sigma-Aldrich "Particle Size Conversion Table" (2004); from World Wide Web <http://www.sigmaaldrich.com/chemistry/learning-center/technical-library/particle-size-conversion.printerview.html>.

\* cited by examiner

BIOMASS COMPOSITIONS FOR CATALYTIC GASIFICATION

CROSS-REFERENCE TO RELATED APPLICATIONS

This application claims priority under 35 U.S.C. §119 from U.S. Provisional Application Ser. No. 61/032,734 (filed Feb. 29, 2008), the disclosure of which is incorporated by reference herein for all purposes as if fully set forth.

FIELD OF THE INVENTION

The present disclosure relates to particulate compositions comprising biomass and non-biomass components as well as at least one gasification catalyst. Further, the disclosure relates to processes for preparation of the particulate compositions and for gasification of the same in the presence of steam to form gaseous products, and in particular, methane.

BACKGROUND OF THE INVENTION

In view of numerous factors such as higher energy prices and environmental concerns, the production of value-added gaseous products from lower-fuel-value carbonaceous feedstocks, such as biomass, coal and petroleum coke, is receiving renewed attention. The catalytic gasification of such materials to produce methane and other value-added gases is disclosed, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1, US2006/0265953A1, US2007/000177A1, US2007/083072A1, US2007/0277437A1 and GB1599932.

Treatment of biomass alone can have high theoretical carbon conversion, but has its own challenges regarding maintaining bed composition, fluidization of the bed in the gasification reactor, control of possible liquid phases and agglomeration of the bed in the gasification reactor and char withdrawal. Additionally, biomass has inherently high moisture content, requiring additional handling and drying measures to provide an appropriate feedstock for gasification. Therefore, methods and compositions are needed which can support and provide a gasification catalyst for the gasification of biomass while addressing the preceding challenges.

SUMMARY OF THE INVENTION

The present disclosure relates to particulate compositions comprising a biomass, a non-biomass, and at least one gasification catalyst. Further, the disclosure relates to processes for preparation of the particulate compositions and for gasification of the same in the presence of steam to form gaseous products, and in particular, methane. Through blending appropriate levels of non-biomass materials with the biomass in the feedstock, problems such as bed fluidization may be addressed.

In a first aspect, the present invention provides a particulate composition having a particle distribution size suitable for gasification in a fluidized bed zone, the particulate composition comprising an intimate mixture of (a) a first carbonaceous feedstock that is a biomass; (b) a second carbonaceous feedstock that is a non-biomass; and (c) a gasification catalyst which, in the presence of steam and under suitable temperature and pressure, exhibits gasification activity whereby a plurality of gases comprising methane and one or more of hydrogen, carbon monoxide, carbon dioxide, hydrogen sulfide, ammonia and other higher hydrocarbons are formed, wherein, (i) the first carbonaceous feedstock and second carbonaceous feedstock are present in the particulate composition at a weight ratio of from about 5:95 to about 95:5; (ii) the gasification catalyst loaded onto at least one of the first carbonaceous feedstock and the second carbonaceous feedstock; (iii) the gasification catalyst comprises a source of at least one alkali metal and is present in an amount sufficient to provide, in the particulate composition, a ratio of alkali metal atoms to carbon atoms ranging from 0.01 to about 0.10.

In a second aspect, the present invention provides a process for converting a particulate composition into a plurality of gaseous products, the process comprising the steps of: (a) supplying a particulate composition according to the first aspect to a gasifying reactor; (b) reacting the particulate composition in the gasifying reactor in the presence of steam and under suitable temperature and pressure to form a plurality of gaseous including methane and one or more of hydrogen, carbon monoxide, carbon dioxide, hydrogen sulfide, ammonia and other higher hydrocarbons; and (c) at least partially separating the plurality of gaseous products to produce a stream comprising a predominant amount of one of the gaseous products.

In a third aspect, the present invention provides a process for preparing a particulate composition, the process comprising the steps of: (a) providing a first particulate carbonaceous feedstock that is a biomass, a second particulate carbonaceous feedstock that is a non-biomass, and an alkali metal gasification catalyst which, in the presence of steam and under suitable temperature and pressure, exhibits gasification activity whereby a plurality of gases including methane and at least one or more of hydrogen, carbon monoxide, carbon dioxide, hydrogen sulfide, ammonia and other higher hydrocarbons are formed from the particulate composition; (b) mixing the first particulate carbonaceous feedstock, the second particulate carbonaceous feedstock and, the alkali metal gasification catalyst to form a mixture; and (c) optionally thermally treating the mixture under a flow of inert dry gas to form the particulate composition, wherein the gasification catalyst comprises a source of at least one alkali metal and is present in an amount sufficient to provide, in the particulate composition, a ratio of alkali metal atoms of the gasification catalyst to carbon atoms ranging from about 0.01 to about 0.10.

DETAILED DESCRIPTION

The present disclosure relates to a particulate composition, methods for the preparation of the particulate composition, and methods for the catalytic gasification of the particulate composition. Generally, the particulate composition includes one or more biomasses in various blends with one or more non-biomass carbonaceous materials, for example, coals and/or petroleum coke.

The present invention can be practiced, for example, using any of the developments to catalytic gasification technology disclosed in commonly owned US2007/0000177A1, US2007/0083072A1 and US2007/0277437A1; and U.S. patent application Ser. No. 12/178,380 (filed 23 Jul. 2008), U.S. patent application Ser. No. 12/234,012 (filed 19 Sep. 2008) and U.S. patent application Ser. No. 12/234,018 (filed 19 Sep. 2008). All of the above are incorporated by reference herein for all purposes as if fully set forth.

Moreover, the present invention can be practiced in conjunction with the subject matter of the following U.S. patent applications, each of which was filed on Dec. 28, 2008: Ser. No. 12/342,554, entitled "CATALYTIC GASIFICATION PROCESS WITH RECOVERY OF ALKALI METAL FROM CHAR"; Ser. No. 12/342,565, entitled "PETROLEUM COKE COMPOSITIONS FOR CATALYTIC GASIFICATION"; Ser. No. 12/342,578, entitled "COAL COMPOSITIONS FOR CATALYTIC GASIFICATION"; Ser. No. 12/342,596, entitled "PROCESSES FOR MAKING SYNTHESIS GAS AND SYNGAS-DERIVED PRODUCTS"; Ser. No. 12/342,608, entitled "PETROLEUM COKE COMPOSITIONS FOR CATALYTIC GASIFICATION"; Ser. No. 12/342,628, entitled "PROCESSES FOR MAKING SYNGAS-DERIVED PRODUCTS"; Ser. No. 12/342,663, entitled "CARBONACEOUS FUELS AND PROCESSES FOR MAKING AND USING THEM"; Ser. No. 12/342,715, entitled "CATALYTIC GASIFICATION PROCESS WITH RECOVERY OF ALKALI METAL FROM CHAR"; Ser. No. 12/342,736, entitled "CATALYTIC GASIFICATION PROCESS WITH RECOVERY OF ALKALI METAL FROM CHAR"; Ser. No. 12/343,143, entitled "CATALYTIC GASIFICATION PROCESS WITH RECOVERY OF ALKALI METAL FROM CHAR"; Ser. No. 12/343,149, entitled "STEAM GENERATING SLURRY GASIFIER FOR THE CATALYTIC GASIFICATION OF A CARBONACEOUS FEEDSTOCK"; and Ser. No. 12/343,159, entitled "CONTINUOUS PROCESSES FOR CONVERTING CARBONACEOUS FEEDSTOCK INTO GASEOUS PRODUCTS". All of the above are incorporated by reference herein for all purposes as if fully set forth.

Further, the present invention can be practiced in conjunction with the subject matter of the following U.S. patent applications, each of which was filed concurrently herewith: Ser. No. 12/395,293, entitled "PROCESSES FOR MAKING ABSORBENTS AND PROCESSES FOR REMOVING CONTAMINANTS FROM FLUIDS USING THEM"; Ser. No. 12/395,309, entitled "STEAM GENERATION PROCESSES UTILIZING BIOMASS FEEDSTOCKS"; Ser. No. 12/395,320, entitled "REDUCED CARBON FOOTPRINT STEAM GENERATION PROCESSES"; Ser. No. 12/395,330, entitled "PROCESS AND APPARATUS FOR THE SEPARATION OF METHANE FROM A GAS STREAM"; Ser. No. 12/395,344, entitled "SELECTIVE REMOVAL AND RECOVERY OF ACID GASES FROM GASIFICATION PRODUCTS"; Ser. No. 12/395,348, entitled "COAL COMPOSITIONS FOR CATALYTIC GASIFICATION"; Ser. No. 12/395,353, entitled "COAL COMPOSITIONS FOR CATALYTIC GASIFICATION"; Ser. No. 12/395,372, entitled "CO-FEED OF BIOMASS AS SOURCE OF MAKEUP CATALYSTS FOR CATALYTIC COAL GASIFICATION"; Ser. No. 12/395,381, entitled "COMPACTOR-FEEDER"; Ser. No. 12/395,385, entitled "CARBONACEOUS FINES RECYCLE"; Ser. No. 12/395,429, entitled "BIOMASS CHAR COMPOSITIONS FOR CATALYTIC GASIFICATION"; and Ser. No. 12/395,433, entitled "CATALYTIC GASIFICATION PARTICULATE COMPOSITIONS". All of the above are incorporated herein by reference for all purposes as if fully set forth.

All publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The materials, methods, and examples herein are illustrative only and, except as specifically stated, are not intended to be limiting.

Biomass

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal.

The term "plant-based biomass" as used herein means materials derived from green plants, crops, algae, and trees, such as, but not limited to, sweet sorghum, bagasse, sugarcane, bamboo, hybrid poplar, hybrid willow, albizia trees, eucalyptus, alfalfa, clover, oil palm, switchgrass, sudangrass, millet, jatropha, and miscanthus (e.g., Miscanthus×giganteus). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

Non-Biomass

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, or mixtures thereof.

(a) Petroleum Coke

The terms "petroleum coke" and "petcoke" as used herein includes both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil, which petoke contains ash as a minor component, typically about 1.0 wt % or less, and more typically about 0.5 wt % of less, based on the weight of the coke. Typically, the ash in such lower-ash cokes comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes comprises materials such as silica and/or alumina.

Petroleum coke has an inherently low moisture content, typically, in the range of from about 0.2 to about 2 wt % (based on total petroleum coke weight); it also typically has a very low water soaking capacity to allow for conventional catalyst impregnation methods. The resulting particulate compositions contain, for example, a lower average moisture content which increases the efficiency of downstream drying operation versus conventional drying operations.

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % percent inorganic compounds, based on the weight of the petroleum coke.

(b) Coal

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (N. Dak.), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art [see, for example, *Coal Data: A Reference*, Energy Information Administration, Office of Coal, Nuclear, Electric and Alternate Fuels, U.S. Department of Energy, DOE/EIA-0064(93), February 1995].

The ash produced from a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash [Meyers, et al. *Fly Ash. A Highway Construction Material*. Federal Highway Administration, Report No. FHWA-IP-76-16, Washington, D.C., 1976].

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. [Moulton, Lyle K. "Bottom Ash and Boiler Slag," *Proceedings of the Third International Ash Utilization Symposium*. U.S. Bureau of Mines, Information Circular No. 8640, Washington, D.C., 1973.]

Catalyst Components

Particulate compositions according to the present disclosure are based on the above-described biomass and non-biomass, such as coal and/or petroleum coke, and further comprise an amount of an alkali metal component, as alkali metal and/or an alkali metal compound. Typically, the gasification catalyst is present in an amount sufficient to provide, a ratio of alkali metal atoms to carbon atoms in the particulate composition ranging from about 0.01, or from about 0.02, or from about 0.03, or from about 0.04, to about 0.10, or to about 0.08, or to about 0.07, or to about 0.06.

Typically, the alkali metal component may also be provided within the particulate compositions to achieve an alkali metal content of from about 3 to about 10 times more than the combined ash content of the biomass and non-biomass in the particulate composition, on a mass basis.

Suitable alkali metals are lithium, sodium, potassium, rubidium, cesium, and mixtures thereof. Particularly useful are potassium sources. Suitable alkali metal compounds include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

Co-catalysts or other catalyst additives may also be utilized, such as disclosed in the previously incorporated references.

Particulate Composition

The particulate composition can be supplied as a fine particulate having an average particle size of from about 25 microns, or from about 45 microns, up to about 2500 microns, or up to about 500 microns. One skilled in the art can readily determine the appropriate particle size for the individual particulates and the particulate composition. For example, when a fluid bed gasification reactor is used, the particulate composition can have an average particle size which enables incipient fluidization of the particulate composition at the gas velocity used in the fluid bed gasification reactor.

The ratio of the biomass particulate and non-biomass in the particulate composition can be selected based on technical considerations, processing economics, availability, and proximity of the non-biomass and biomass sources. The availability and proximity of the sources for the particulate compositions affect the price of the feeds, and thus, the overall production costs of the catalytic gasification process. For example, the biomass and the non-biomass can be blended in at about 5:95, about 10:90, about 15:85, about 20:80, about 25:75, about 30:70, about 35:65, about 40:60, about 45:55, about 50:50, about 55:45, about 60:40, about 65:35, about 70:20, about 75:25, about 80:20, about 85:15, about 90:10, or about 95:5 by weight on a wet or dry basis, depending on the processing conditions.

As indicated above, the particulate composition further comprises a gasification catalyst that comprises a source of at least one alkali metal. The alkali metal component may be loaded onto the biomass or non-biomass particulate; however, the alkali metal component may be blended into the particulate composition as a separate particulate source as well. In one embodiment, at least the non-biomass particulate of the particulate composition comprises a gasification catalyst and optionally, a co-catalyst/catalyst additive as discussed previously. In another embodiment, both the biomass and non-biomass particulates comprise a gasification catalyst.

More significantly, the biomass and non-biomass sources, as well as the ratio of the biomass particulate to the non-biomass particulate, can be used to control other material characteristics of the feedstock blend.

Non-biomass materials, such as coals, and certain biomass materials, such as rice hulls, typically include significant quantities of inorganic matter including calcium, alumina and silica which form inorganic oxides (i.e., ash) in the gasification reactor. At temperatures above about 500° C. to about 600° C., potassium and other alkali metals can react with the alumina and silica in ash to form insoluble alkali aluminosilicates. In this form, the alkali metal is substantially water-insoluble and inactive as a catalyst. To prevent buildup of the residue in the gasification reactor, a solid purge of char comprising ash, unreacted carbonaceous material, and various alkali metal compounds (both water soluble and water insoluble) are routinely withdrawn. Preferably, the alkali metal is recovered from the char, and any unrecovered catalyst is generally compensated by a catalyst make-up stream. The more alumina and silica that is in the feedstock, the more costly it is to obtain a higher alkali metal recovery.

In preparing the particulate compositions of the present invention, the ash content of the biomass and non-biomass particulates can be selected to be, for example, to be about 20 wt % or less, or about 15 wt % or less, or about 10 wt % or less, or about 5 wt % or less, depending on ratio of the particulates and/or the starting ash in the non-biomass source. In other embodiments, the resulting particulate composition can comprise an ash content ranging from about 5 wt %, or from about 10 wt %, to about 20 wt %, or to about 15 wt %, based on the weight of the particulate composition. In other embodiments, the ash content of the particulate composition can comprise less than about 20 wt %, or less than about 15 wt %, or less than about 10 wt %, or less than about 8 wt %, or less than about 6 wt % alumina, based on the weight of the ash. In certain embodiments, the resulting particulate composition can comprise an ash content of less than about 20 wt %, based on the weight of the particulate composition where the ash content of the particulate composition comprises less than about 20 wt % alumina, or less than about 15 wt % alumina, based on the weight of the ash.

Such lower alumina values in the particulate composition allow for decreased losses of alkali catalysts in the gasification process. As indicated above, alumina can react with alkali source to yield an insoluble char comprising, for example, an alkali aluminate or aluminosilicate. Such insoluble char can lead to decreased catalyst recovery (i.e., increased catalyst loss), and thus, require additional costs of make-up catalyst in the overall gasification process, as will be discussed later.

Additionally, the resulting particulate compositions can have a significantly higher % carbon, and thus btu/lb value and methane product per unit weight of the particulate composition. In certain embodiments, the resulting particulate composition has a carbon content ranging from about 75 wt %, or from about 80 wt %, or from about 85 wt %, or from about 90 wt %, up to about 95 wt %, based on the combined weight of the non-biomass and biomass.

Methods for Making the Particulate Composition

The biomass and non-biomass sources typically require initial processing to prepare the particulate composition for gasification. Each component of the particulate composition may be separately processed, for example, to crush the sources to prepare appropriately sized particulates and/or to add one or more gasification catalysts, and subsequently mixed.

The particulates of the biomass and non-biomass sources can be prepared via crushing and/or grinding, either separately or together, according to any methods known in the art, such as impact crushing and wet or dry grinding to yield particulates. Depending on the method utilized for crushing and/or grinding of the biomass and non-biomass sources, the resulting particulates may be sized (i.e., separated according to size) to provide an appropriate feedstock.

Any method known to those skilled in the art can be used to size the particulates. For example, sizing can be preformed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the biomass and non-biomass particulates. Classification equipment can include ore sorters, gas cyclones, hydrocyclones, rake classifiers, rotating trommels, or fluidized classifiers. The biomass and non-biomass can be also sized or classified prior to grinding and/or crushing.

Additional feedstock processing steps may be necessary depending on the qualities of biomass and non-biomass sources. Biomass may contain high moisture contents, such as green plants and grasses, can require drying prior to crushing; likewise, non-biomass such as high-moisture coals, can require drying prior to crushing. Some caking coals can require partial oxidation to simplify gasification reactor operation. Non-biomass feedstocks deficient in ion-exchange sites, such as anthracites or low-sulfur petroleum cokes, can be pre-treated to create additional ion-exchange sites to facilitate catalysts loading and/or association. Such pre-treatments can be accomplished by any method known to the art that creates ion-exchange capable sites and/or enhances the porosity of the feedstock (see, for example, previously incorporated U.S. Pat. No. 4,468,231 and GB1599932). Often, pre-treatment is accomplished in an oxidative manner using any oxidant known to the art.

In one example, the non-biomass and/or biomass is wet ground and sized (e.g., to a particle size distribution of 25 to 2500 microns) and then drained of its free water (i.e., dewatered) to a wet cake consistency. Examples of suitable methods for the wet grinding, sizing, and dewatering are known to those skilled in the art; for example, see previously incorporated U.S. patent application Ser. No. 12/178,380 (filed 23 Jul. 2008).

The filter cakes of the non-biomass and/or biomass particulates formed by the wet grinding in accordance with one embodiment of the present disclosure can have a moisture content ranging from about 40% to about 60%, about 40% to about 55%, or below 50%. It will be appreciated by one of ordinary skill in the art that the moisture content of dewatered wet ground non-biomass and/or biomass particulates depends on the particular type of non-biomass or biomass, the particle size distribution, and the particular dewatering equipment used. Such filter cakes of biomass and/or non-biomass particulates can be thermally treated, as described herein, to produce dry biomass and/or dry non-biomass particulates which can be utilized in preparing the particulate compositions as described below.

The non-biomass and/or biomass particulates may subsequently treated to associate at least a first catalyst (e.g., gasification catalyst) therewith. Optionally, a second component (e.g., a second gasification catalyst or a co-catalyst, or other additive) can be provided to one or more of the particulates; in such instances, the particulates can be treated in separate processing steps to provide the first catalyst and second component. For example, the primary gasification catalyst can be supplied to a first non-biomass and/or biomass particulate (e.g., a potassium and/or sodium source), followed by a separate treatment to provide a calcium source to the first non-biomass and/or biomass particulate. Alternatively, the first and second catalysts can be provided as a mixture in a single treatment to a particulate; or a first particulate (e.g., the non-biomass) may be treated with a first catalyst and a second particulate (e.g., biomass) may be treated with a second component and the two treated particulates blended (see, previously incorporated US2007/0000177A1).

Any methods known to those skilled in the art can be used to associate one or more gasification catalysts with the non-biomass and/or biomass particulates. Such methods include but are not limited to, admixing with a solid catalyst source and impregnating the catalyst on to particulates. Several impregnation methods known to those skilled in the art can be employed to incorporate the gasification catalysts. These methods include but are not limited to, incipient wetness impregnation, evaporative impregnation, vacuum impregnation, dip impregnation, ion exchanging, and combinations of these methods.

In one embodiment, an alkali metal gasification catalyst can be impregnated into one or more of the particulates by slurrying with a solution (e.g., aqueous) of the catalyst. When a particulate is slurried with a solution of the catalyst and/or co-catalyst, the resulting slurry can be dewatered to provide a catalyzed particulate, again typically, as a wet cake. The catalyst solution for slurrying the particulate can be prepared from any catalyst source in the present methods, including fresh or make-up catalyst and recycled catalyst or catalyst solution (infra). Methods for dewatering the slurry to provide a wet cake of the catalyzed particulate include filtration (gravity or vacuum), centrifugation, and a fluid press.

One particular method suitable for combining coal with a gasification catalyst to provide a catalyzed particulate is via ion exchange as described in previously incorporated U.S. patent application Ser. No. 12/178,380 (filed 23 Jul. 2008). Catalyst loading by ion exchange mechanism may be maximized based on adsorption isotherms specifically developed for the coal, as discussed in the incorporated reference. Such loading provides a catalyzed particulate as a wet cake. Additional catalyst retained on the ion-exchanged particulate wet cake, including inside the pores, can be controlled so that the total catalyst target value can be obtained in a controlled manner. The catalyst loaded and dewatered wet cake may contain, for example, about 50% moisture. The total amount of catalyst loaded can be controlled by controlling the concentration of catalyst components in the solution, as well as the contact time, temperature and method, as can be readily determined by those of ordinary skill in the relevant art based on the characteristics of the starting coal.

Alternatively, the slurried particulates may be dried with a fluid bed slurry drier (i.e., treatment with superheated steam to vaporize the liquid), or the solution evaporated, to provide a dry catalyzed particulate.

The catalyzed biomass and/or non-biomass particulates typically comprise greater than about 50%, greater than about 70%, greater than about 85%, or greater than about 90% of the total amount of the loaded catalyst associated with the particulate. The percentage of total loaded catalyst that is associated with the particulates can be determined according to methods known to those skilled in the art.

Separate biomass and non-biomass particulates and/or catalyzed biomass and/or non-biomass particulates can be blended appropriately to control, for example, the total catalyst loading or other qualities of the particulate composition, as discussed previously. The appropriate ratios of the separate particulates will depend on the qualities of the feedstocks as well as the desired properties of the particulate composition. For example, a biomass particulate and a catalyzed non-biomass particulate can be combined in such a ratio to yield a particulate composition having a predetermined ash content, as discussed previously.

Any of the preceding particulates, as one or more dry particulates and/or one or more wet cakes, can be combined by any methods known to those skilled in the art including, but not limited to, kneading, and vertical or horizontal mixers, for example, single or twin screw, ribbon, or drum mixers. The resulting particulate composition can be stored for future use or transferred to a feed operation for introduction into a gasification reactor. The particulate composition can be conveyed to storage or feed operations according to any methods known to those skilled in the art, for example, a screw conveyer or pneumatic transport.

Ultimately, the particulate composition may be dried, under a flow of an inert gas, with a fluid bed slurry drier (i.e., treatment with superheated steam to vaporize the liquid), or the solution evaporated, to provide a catalyzed particulate typically having a residual moisture content, for example, of less than about 8 wt %, or less than about 6 wt %, or less than about 4 wt %.

For example, a particulate composition may be prepared according to the preceding methods by providing a first particulate carbonaceous feedstock that is a biomass, a second particulate carbonaceous feedstock that is a non-biomass, and a gasification catalyst. The first particulate carbonaceous feedstock and second particulate carbonaceous feedstock can be contacted as a blend with an aqueous solution comprising gasification catalyst to form a slurry. The resulting slurry can be dewatered to form a catalyst-loaded wet cake, and the wet cake can be thermally treated under a flow of inert dry gas to form the particulate composition.

In another example, a particulate composition may be prepared according to the preceding methods by providing a first particulate carbonaceous feedstock that is a biomass, a second particulate carbonaceous feedstock that is a non-biomass, and a gasification catalyst. The first particulate carbonaceous feedstock can be contacted with an aqueous solution comprising gasification catalyst to form a slurry, and the slurry dewatered to form a catalyst-loaded wet cake. The catalyst-loaded wet cake can be mixed with the second particulate carbonaceous feedstock to form a mixture. Finally, the mixture can be thermally treated, under a flow of inert dry gas, to form the particulate composition.

In another yet example, a particulate composition may be prepared according to the preceding methods by providing a first particulate carbonaceous feedstock that is a biomass, a second particulate carbonaceous feedstock that is a non-biomass, and a gasification catalyst. The second particulate carbonaceous feedstock can be contacted with an aqueous solution comprising gasification catalyst to form a slurry and the slurry dewatered to form a catalyst-loaded wet cake. The catalyst-loaded wet cake can be mixed with the first particulate carbonaceous feedstock to form a mixture, and the mixture thermally treated under a flow of inert dry gas to form the particulate composition.

In another yet example, a particulate composition may be prepared according to the preceding methods by providing a first particulate carbonaceous feedstock that is a biomass, a second particulate carbonaceous feedstock that is a non-biomass, and a gasification catalyst. The first and second particulate carbonaceous feedstocks can be separately contacted with an aqueous solution comprising gasification catalyst to form a first and second slurry; the first and second slurry dewatered to form first and second catalyst-loaded wet cakes. The first and second catalyst-loaded wet cakes can be mixed to form a mixture, and the mixture thermally treated under a flow of inert dry gas to form the particulate composition.

In another yet example, a particulate composition may be prepared according to the preceding methods by providing a first particulate carbonaceous feedstock that is a biomass, a second particulate carbonaceous feedstock that is a non-biomass, and a gasification catalyst. The first and second particulate carbonaceous feedstocks can be separately contacted with an aqueous solution comprising gasification catalyst to form a first and second slurry; the first and second slurry dewatered to form first and second catalyst-loaded wet cakes. The first and second catalyst-loaded wet cakes can be thermally treated for form first and second dry particulates; and the first and second dry particulates mixed to form a mixture which is the particulate composition.

Catalytic Gasification Methods

The particulate compositions of the present disclosure are particularly useful in integrated gasification processes for converting biomass and non-biomass to combustible gases, such as methane. The gasification reactors for such processes are typically operated at moderately high pressures and temperature, requiring introduction of the particulate composition to the reaction zone of the gasification reactor while maintaining the required temperature, pressure, and flow rate of the feedstock. Those skilled in the art are familiar with feed systems for providing feedstocks to high pressure and/or temperature environments, including, star feeders, screw feeders, rotary pistons, and lock-hoppers. It should be understood that the feed system can include two or more pressure-balanced elements, such as lock hoppers, which would be used alternately.

In some instances, the particulate composition can be prepared at pressures conditions above the operating pressure of gasification reactor. Hence, the particulate composition can be directly passed into the gasification reactor without further pressurization.

Any of several catalytic gasifiers can be utilized. Suitable gasification reactors include counter-current fixed bed, co-current fixed bed, fluidized bed, entrained flow, and moving bed reactors.

The particulate compositions are particularly useful for gasification at moderate temperatures of at least about 450° C., or of at least about 600° C. or above, to about 900° C., or to about 750° C., or to about 700° C.; and at pressures of at least about 50 psig, or at least about 200 psig, or at least about 400 psig, to about 1000 psig, or to about 700 psig, or to about 600 psig.

The gas utilized in the gasification reactor for pressurization and reactions of the particulate composition typically comprises steam, and optionally, oxygen or air, and are supplied to the reactor according to methods known to those skilled in the art. For example, any of the steam boilers known to those skilled in the art can supply steam to the reactor. Such boilers can be powered, for example, through the use of any carbonaceous material such as powdered coal, biomass etc., and including but not limited to rejected carbonaceous materials from the particulate composition preparation operation (e.g., fines, supra). Steam can also be supplied from a second gasification reactor coupled to a combustion turbine where the exhaust from the reactor is thermally exchanged to a water source and produce steam. Alternatively, the steam may be provided to the gasification reactor as described in previously incorporated U.S. patent application Ser. No. 12/395,309, entitled "STEAM GENERATION PROCESSES UTILIZING BIOMASS FEEDSTOCKS", and Ser. No. 12/395,320, entitled "REDUCED CARBON FOOTPRINT STEAM GENERATION PROCESSES".

Recycled steam from other process operations can also be used for supplying steam to the reactor. For example, when the slurried particulate composition is dried with a fluid bed slurry drier, as discussed previously, the steam generated through vaporization can be fed to the gasification reactor.

The small amount of required heat input for the catalytic gasification reaction can be provided by superheating a gas mixture of steam and recycle gas feeding the gasification reactor by any method known to one skilled in the art. In one method, compressed recycle gas of CO and $H_2$ can be mixed with steam and the resulting steam/recycle gas mixture can be further superheated by heat exchange with the gasification reactor effluent followed by superheating in a recycle gas furnace.

A methane reformer can be included in the process to supplement the recycle carbon monoxide and hydrogen fed to the reactor to ensure that enough recycle gas is supplied to the reactor so that the net heat of reaction is as close to neutral as possible (only slightly exothermic or endothermic), in other words, that the reaction is run under thermally neutral conditions. In such instances, methane can be supplied for the reformer from the methane product, as described below.

Reaction of the particulate composition under the described conditions typically provides a crude product gas and a char. The char produced in the gasification reactor during the present processes typically is removed from the gasification reactor for sampling, purging, and/or catalyst recovery. Methods for removing char are well known to those skilled in the art. One such method taught by EP-A-0102828, for example, can be employed. The char can be periodically withdrawn from the gasification reactor through a lock hopper system, although other methods are known to those skilled in the art. Processes have been developed to recover alkali metal from the solid purge in order to reduce raw material costs and to minimize environmental impact of a catalytic gasification process.

The char can be quenched with recycle gas and water and directed to a catalyst recycling operation for extraction and reuse of the alkali metal catalyst. Particularly useful recovery and recycling processes are described in U.S. Pat. No. 4,459,138, as well as previously incorporated U.S. Pat. No. 4,057,512 and US2007/0277437A1, and previously incorporated U.S. patent application Ser. Nos. 12/342,554, 12/342,715, 12/342,736 and 12/343,143. Reference can be had to those documents for further process details.

Crude product gas effluent leaving the gasification reactor can pass through a portion of the gasification reactor which serves as a disengagement zone where particles too heavy to be entrained by the gas leaving the gasification reactor (i.e., fines) are returned to the fluidized bed. The disengagement zone can include one or more internal cyclone separators or similar devices for removing fines and particulates from the gas. The gas effluent passing through the disengagement zone and leaving the gasification reactor generally contains $CH_4$, $CO_2$, $H_2$ and CO, $H_2S$, $NH_3$, unreacted steam, entrained fines, and other contaminants such as COS.

The gas stream from which the fines have been removed can then be passed through a heat exchanger to cool the gas and the recovered heat can be used to preheat recycle gas and generate high pressure steam. Residual entrained fines can also be removed by any suitable means such as external cyclone separators optionally followed by Venturi scrubbers. The recovered fines can be processed to recover alkali metal catalyst, or directly recycled back to feedstock preparation as described in previously U.S. patent application Ser. No. 12/395,385, entitled "CARBONACEOUS FINES RECYCLE".

The gas stream from which the fines have been removed can be fed to COS hydrolysis reactors for COS removal (sour process) and further cooled in a heat exchanger to recover residual heat prior to entering water scrubbers for ammonia recovery, yielding a scrubbed gas comprising at least $H_2S$, $CO_2$, CO, $H_2$, and $CH_4$. Methods for COS hydrolysis are known to those skilled in the art, for example, see U.S. Pat. No. 4,100,256.

The residual heat from the scrubbed gas can be used to generate low pressure steam. Scrubber water and sour process condensate can be processed to strip and recover $H_2S$, $CO_2$ and $NH_3$; such processes are well known to those skilled in the art. $NH_3$ can typically be recovered as an aqueous solution (e.g., 20 wt %).

A subsequent acid gas removal process can be used to remove $H_2S$ and $CO_2$ from the scrubbed gas stream by a physical absorption method involving solvent treatment of the gas to give a cleaned gas stream. Such processes involve contacting the scrubbed gas with a solvent such as monoethanolamine, diethanolamine, methyldiethanolamine, diisopropylamine, diglycolamine, a solution of sodium salts of amino acids, methanol, hot potassium carbonate or the like. One method can involve the use of Selexol® (UOP LLC, Des Plaines, Ill. USA) or Rectisol® (Lurgi AG, Frankfurt am Main, Germany) solvent having two trains; each train consisting of an $H_2S$ absorber and a $CO_2$ absorber. The spent solvent containing $H_2S$, $CO_2$ and other contaminants can be regenerated by any method known to those skilled in the art, including contacting the spent solvent with steam or other stripping gas to remove the contaminants or by passing the spent solvent through stripper columns. Recovered acid gases can be sent for sulfur recovery processing. The resulting cleaned gas stream contains mostly $CH_4$, $H_2$, and CO and, typically, small amounts of $CO_2$ and $H_2O$. Any recovered $H_2S$ from the acid gas removal and sour water stripping can be converted to elemental sulfur by any method known to those skilled in the art, including the Claus process. Sulfur can be recovered as a molten liquid. One method for removing acid gases from the scrubbed gas stream is described in previously incorporated U.S. patent application Ser. No. 12/395,344, entitled "SELECTIVE REMOVAL AND RECOVERY OF ACID GASES FROM GASIFICATION PRODUCTS".

The cleaned gas stream can be further processed to separate and recover $CH_4$ by any suitable gas separation method known to those skilled in the art including, but not limited to, cryogenic distillation and the use of molecular sieves or ceramic membranes, or via the generation of methane hydrate as disclosed in previously incorporated U.S. patent application Ser. No. 12/395,330, entitled "PROCESS AND APPARATUS FOR THE SEPARATION OF METHANE FROM A GAS STREAM". Typically, two gas streams can be produced by the gas separation process, a methane product stream and a syngas stream ($H_2$ and CO). The syngas stream can be compressed and recycled to the gasification reactor. If necessary, a portion of the methane product can be directed to a reformer, as discussed previously and/or a portion of the methane product can be used as plant fuel.

EXAMPLES

Example 1

Feedstock Preparation

As-received coal (Powder River Basin) can be stage-crushed to maximize the amount of material having particle sizes ranging from about 0.85 to about 1.4 mm. Fines (<0.85 mm) can be separated from the crushed materials by vibratory screening and directed to the steam generating combustion reactor.

The crushed coal can be slurried with an aqueous solution of potassium carbonate, dewatered, and dried via a fluid bed slurry drier to yield a catalyzed feedstock typically containing 185 lb coal (88 wt %), 14.9 lb catalyst (7 wt %), and 10.5 lb moisture (5 wt %). The coal fines separated at the crushing stage can subsequently be used as the feedstock for combustion reactor for the preparation of steam.

Switchgrass can be dried and crushed to produce a particulate having an average size of about 250 microns. The coal fines from the preceding crushing stage can be blended in a twin screw mixer to produce a biomass feedstock having a 9:1 w/w ratio of the switchgrass to coal fines.

Example 2

Catalytic Gasification

The biomass feedstock of Example 1 can be provided to a combustion reactor fed by an enriched oxygen source. The resulting exhaust gas from the combustion reactor will contain hot $CO_2$. The exhaust gas can be passed through a heat exchanger in contact with a water source to produce steam. The generated steam and the exhaust gas from the combustion reactor can be superheated and then introduced to a fluidized bed gasification reactor (catalytic gasifier) supplied with the catalyzed feedstock of Example 1. The catalyzed feedstock should be introduced under a positive pressure of nitrogen. Typical conditions for the catalytic gasifier would be: total pressure, 500 psi and temperature, 1200° F. The effluent of the catalytic gasifier would contain methane, $CO_2$, $H_2$, CO, water, $H_2S$, ammonia, and nitrogen, which can be passed to a scrubber to remove ammonia, and an acid gas removal unit to remove $H_2S$ and $CO_2$. The $CO_2$ can be recovered.

We claim:

1. A process for preparing a particulate composition, the process comprising the steps of:
    (a) providing a first particulate carbonaceous feedstock that is a biomass, a second particulate carbonaceous feedstock that is a non-biomass, and an alkali metal gasification catalyst which, in the presence of steam and under suitable temperature and pressure, exhibits gasification activity whereby a plurality of gases including methane and at least one or more gases selected from the group consisting of hydrogen, carbon monoxide, carbon dioxide, hydrogen sulfide, ammonia and other higher hydrocarbons are formed from the particulate composition;
    (b) mixing the first particulate carbonaceous feedstock, the second particulate carbonaceous feedstock and, the alkali metal gasification catalyst to form a mixture; and
    (c) optionally thermally treating the mixture under a flow of inert dry gas to form the particulate composition,
wherein the gasification catalyst comprises a source of at least one alkali metal and is present in an amount sufficient to provide, in the particulate composition, a ratio of alkali metal atoms of the gasification catalyst to carbon atoms ranging from about 0.01 to about 0.10.

2. The process according to claim 1, wherein the first carbonaceous feedstock and second carbonaceous feedstock are contacted with an aqueous solution comprising the gasification catalyst to form a slurry; the slurry is dewatered to form a catalyst-loaded wet cake which is the mixture; and the mixture is thermally treated to form the particulate composition.

3. The process according to claim 1, wherein the first carbonaceous feedstock and second carbonaceous feedstock are contacted separately with an aqueous solution comprising the gasification catalyst to form a first and a second slurry, the first and second slurries are dewatered separately to form a first and a second catalyst-loaded wet cake; the first and second catalyst-loaded wet cakes are combined to form the mixture; and the mixture is thermally treated to form the particulate composition.

4. The process according to claim 1, wherein the first carbonaceous feedstock and second carbonaceous feedstock are contacted separately with an aqueous solution comprising the gasification catalyst to form a first and a second slurry, the first and second slurries are dewatered separately to form a first and a second catalyst-loaded wet cake; the first and second catalyst-loaded wet cakes are thermally treated to form first and second dry particulates; and the first and second dry particulates are combined to form the mixture which is the particulate composition.

5. The process according to claim 1, wherein the first carbonaceous feedstock is contacted with an aqueous solution comprising the gasification catalyst to form a slurry; the slurry is dewatered to form a catalyst-loaded wet cake; and the catalyst-loaded wet cake is mixed with the second carbonaceous feedstock to form the mixture.

6. The process according to claim 1, wherein the second carbonaceous feedstock is contacted with an aqueous solution comprising the gasification catalyst to form a slurry; the slurry is dewatered to form a catalyst-loaded wet cake; and the catalyst-loaded wet cake is mixed with the first carbonaceous feedstock to form the mixture.

7. The process according to claim 1, wherein the alkali metal comprises potassium, sodium or both.

8. The process according to claim 7, wherein the alkali metal is potassium.

9. The process according to claim 1, wherein the particulate composition has a particle size ranging from about 25 microns to about 2500 microns.

* * * * *